United States Patent [19]
Drnevich et al.

[11] Patent Number: 5,266,291
[45] Date of Patent: Nov. 30, 1993

[54] PACKED BED ARRANGEMENT FOR OXIDATION REACTION SYSTEM

[75] Inventors: Raymond F. Drnevich, Clarence Center, N.Y.; Douglas R. Dreisinger, Oakville, Canada

[73] Assignee: Praxair Technology, Inc., Danbury, Conn.

[21] Appl. No.: 880,073

[22] Filed: May 5, 1992

[51] Int. Cl.$^5$ .......................... B01J 8/00; C01B 21/26; C01C 3/00; C07D 261/18
[52] U.S. Cl. .................................. 423/392; 423/245.1; 423/403; 423/404; 423/375; 423/376; 549/248; 549/262; 558/320; 562/532; 568/431; 568/716
[58] Field of Search ................. 423/245.1, 237, 238, 423/392, 403, 404, 437, 375, 376; 549/248, 262; 558/320; 562/532; 568/431, 716

[56] References Cited

U.S. PATENT DOCUMENTS

| | | | |
|---|---|---|---|
| 3,812,236 | 5/1974 | Adams et al. | 423/245.1 |
| 3,927,182 | 12/1975 | Powell | 423/392 |
| 4,321,240 | 3/1982 | Robinson | 423/245.1 |
| 4,609,502 | 9/1986 | Khoobiar et al. | 558/320 |
| 4,870,201 | 9/1989 | Ramachandran et al. | 558/319 |
| 4,901,796 | 2/1990 | Drnevich | 166/278 |
| 5,043,461 | 8/1991 | Ramachandran et al. | 549/523 |

OTHER PUBLICATIONS

"Phenol", pp. 454-460, Phthalic Anhydride, pp. 466-471, Formaldehyde, pp. 345-352, Maleic Anhydride, pp. 377-384, Acrylonitrile, pp. 104-108, Hydrogen Cyanide, pp. 360-365, 1988-1989.

*Hydrocarbon Processing*, "Air v Oxygen: Air Best for Formaldehyde and Maleic" R. Maux, Mar. 1976.

*U.S. Dept. of Commerce, National Technical Information Service*, AD-701575, "Limits of Flammability of Gases and Vapors", Coward et al. pp. 25-27, 1952.

*Chemical and Process Engineeering*, "Nitric Acid Manufacture", by E. Bahari, Jan. 1965.

"Extension of Nitric Acid Plant Capacity By Use of Oxygen", by G. Kongshaug, 2nd Uhde Nitric Acid Symposium, Sep. 1981.

*Reigel's Handbook of Industrial Chemistry*, pp. 164-171, 1984.

*Princeton Advanced Technology Inc.*, "Acrylic Acid", pp. 100-103.

Primary Examiner—Gregory A. Heller
Attorney, Agent, or Firm—Chung K. Pak

[57] ABSTRACT

The present invention relates to processes and apparatus for mixing oxidizable reactants with oxidant and oxidizing oxidizable reactants. When ammonia is used as the reactant, nitric acid can be obtained. Through using particular mixing and oxidizing arrangements, the volume of reactant oxidized can be significantly increased.

16 Claims, 2 Drawing Sheets 5,266,291

PACKED BED ARRANGEMENT FOR OXIDATION REACTION SYSTEM

FIELD OF THE INVENTION

The present invention relates to processes and apparatus for mixing oxidizable reactants with oxidant and oxidizing oxidizable reactants, more particularly mixing ammonia with oxidant, oxidizing ammonia and forming nitric acid.

BACKGROUND OF THE INVENTION

The vapor phase oxidation is known to be useful for producing, inter alia, acrylonitrile, acrylic acid, formaldehyde, maleic anhydride, phthalic anhydride, hydrogen cyanide, phenol and nitric acid. Conventionally, it is carried out with air in the presence of oxidation catalysts. Depending on the type of oxidizable reactants involved, reaction conditions may be varied to increase the desired product. Those reaction conditions are well known to one of ordinary skill in the art. The oxidation of ammonia, for example, is usually carried out at high temperature, with a short residence time, in order to maximize the formation of nitrogen oxide without the formation of undesired products, such as nitrogen. Through manipulating the temperature and pressure involved, the nitrogen oxide formed can be further oxidized to the desired nitrogen dioxide and/or to its dimer $(NO_2)_2$, which are capable of being converted into nitric acid by absorption in water.

The above conventional oxidation process, however, is inefficient due to using a low amount of an oxidizable reactant and/or an excessive amount of nitrogen. A low concentration of the reactant, for example, is usually maintained in air due to the flammability limit of a reactant-air mixture. The use of this low concentration of the reactant, of course, reduces the yield of the desired product. Similarly, the presence of an excessive amount of nitrogen which is present in air reduces the production rate of the desired product since a large volume of nitrogen, which is not one of the reactants in the process, takes up much needed capacity or space in an oxidation process system.

To mitigate the shortcomings in this conventional oxidation process, the use of oxygen enriched air or free oxygen to oxidize the oxidizable reactant has been proposed, for example, in U.S. Pat. No. 3,927,182 - Powell. By increasing the concentration of oxygen in the oxidizing source, the quantity of nitrogen processed or introduced into an oxidation reactor system is substantially reduced. Such a reduction in nitrogen, of course, can increase the capacity of a given oxidation system since a greater amount of a reactant can be processed in an oxidation reactor in the absence of nitrogen gas. However, the application of oxygen enriched air or pure oxygen is limited or constrained in an oxidation system due to the flammable or explosive reactions associated with a high concentration of a reactant and/or oxygen in a reactant-oxygen mixture. Indeed, U.S. Pat. No. 3,927,182, in column 5, lines 25–40, teaches, for example, against using a high concentration of ammonia with an oxygen enriched air in nitric acid production systems while "Air best for formaldehyde and maleic" by Maux teaches against using pure oxygen, in lieu of air, in the production of formaldehyde and maleic. Such a constraint adversely affects the production of a large quantity of nitric acid, maleic, formaldehyde and other vapor phase oxidation products.

Accordingly, it is an objective of the present invention to increase the concentration of an oxidizable reactant in an oxidizable reactant-oxygen mixture in vapor phase reactions without incurring the risk of flammable or explosive reactions, thus increasing the production of the desired products.

SUMMARY OF THE INVENTION

The above objective is obtained in the present invention which is drawn to using particular mixing and oxidizing means in the production of, inter alia, acrylonitrile, acrylic acid, formaldehyde, maleic anhydride, phthalic anhydride, hydrogen cyanide, phenol and nitric acid. The process involved is initially directed to mixing at least one oxidizable reactant selected from the group consisting of methanol, benzene, naphthalene, ortho-xylene, cumene, methane, propylene, acrolein and ammonia with oxidant by introducing the oxidizable reactant and oxidant into a packed bed containing inert packing materials, which is subject to a temperature below the autoignition temperature of the mixture. Various temperature moderating means, especially water, may be introduced or sprayed into the packed bed in order to reduce the temperature therein and the temperature of an adjoining reactor. When ammonia is used as a reactant, the concentration of ammonia in the mixture is maintained at at least about 13% by volume, preferably between about 15% by volume and about 33% by volume. This mixture or other oxidizable reactant-oxidant mixtures are generally introduced to the adjoining reactor containing oxidation catalyst to oxidize the reactants therein. The reactor containing oxidation catalyst particles, like the mixing means, inhibits the danger of uncontrolled flammable or explosive reactions due to the availability of the limited free gas space in the reactor. In addition, the reactor may be provided with indirect heat exchange means and/or direct heat exchange means to remove or recover at least a portion of the heat resulting from the oxidation of the reactant to further moderate the temperature therein. The resulting gas containing oxidized reactants from the reactor may then be cooled in a downstream heat boiler system which may be adjacent to the reactor.

As used herein the term "temperature moderating means" includes any fluid that can be used to moderate the temperature of a given oxidation reactor system. The preferred temperature moderating means is water which may be used as a direct cooling medium.

As used herein, the term "oxidant" means any oxygen bearing and/or containing gas. The oxygen bearing gas includes, inter alia, hydrogen peroxide and nitrous oxide while the oxygen containing gas includes, among other things, air, oxygen enriched air and technically pure oxygen. The preferred oxidant has an oxygen concentration of about 30% to about 100%.

As used herein, the term "limited free gas space" means the limited space or gaps formed between packing particles in the reactor for the flow of a gas stream.

As used herein, the term "the auto-ignition of the mixture" means the initiation of oxidation resulting from the internal energy content of the mixture (no external energy source is needed to initiate combustion).

DETAILED DESCRIPTION OF THE INVENTION

The present invention concerns an improvement in vapor phase oxidation reactions wherein a large volume of an oxidizable reactant is oxidized through using a large volume of the oxidizable reactant and oxidant. The use of a large volume of the oxidizable reactant and oxidant is made possible via the removal of a large volume of nitrogen associated with the oxidant, i.e., air, and the control of flammable or explosive reactions which are associated with a high concentration of the oxidizable reactant, more particularly ammonia, in an oxidizable reactant-oxidant gas stream.

Figure 1:
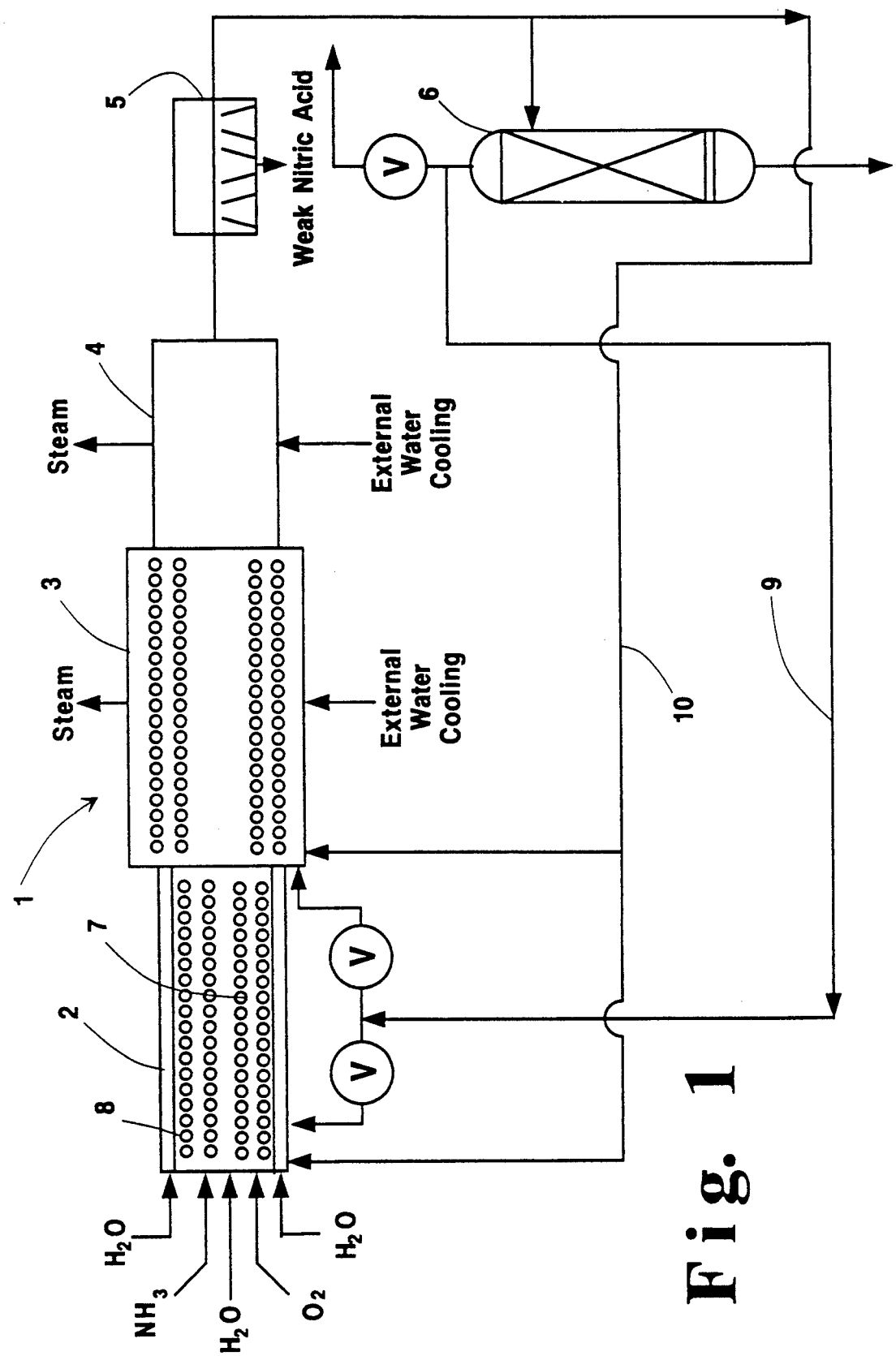
FIG. 1 is a schematic view of a nitric acid production system which illustrates one embodiment of the present invention.
Figure 2:
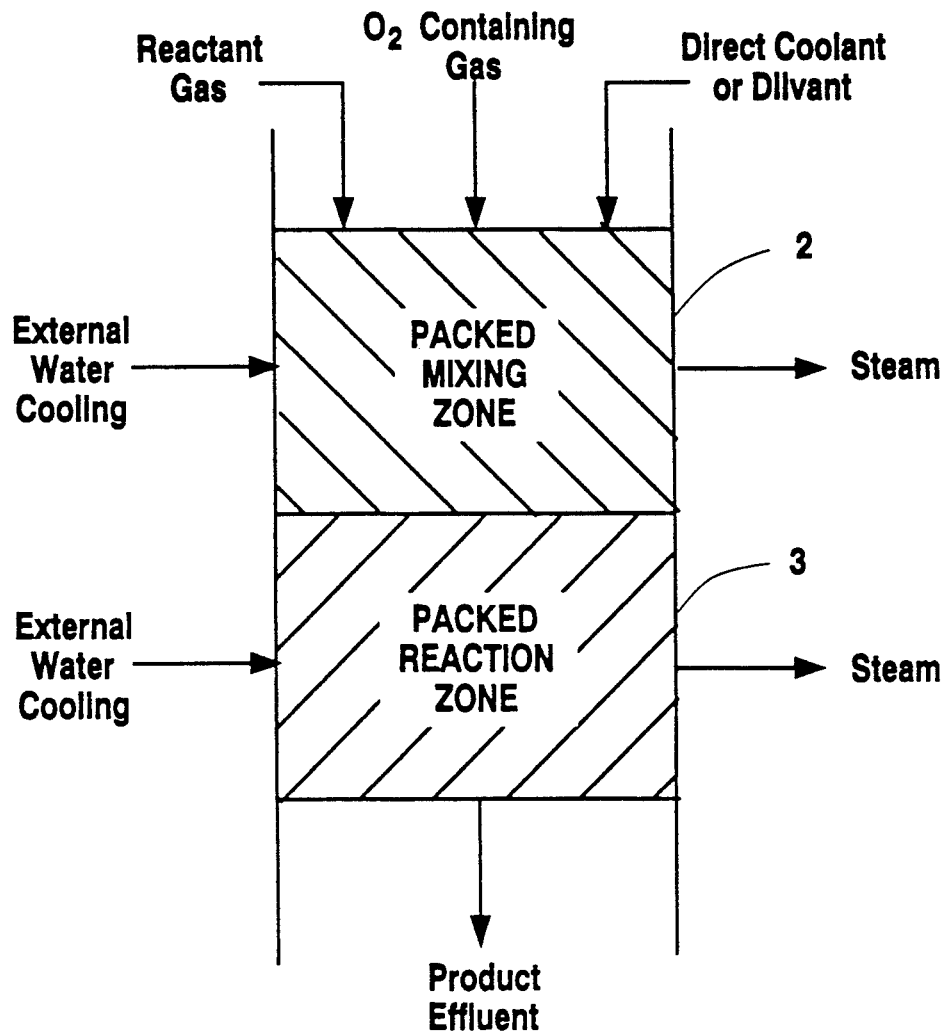
FIG. 2 illustrates a vapor phase oxidation system comprising packed beds of inert particles and catalysts, which represents another embodiment of the present invention.

Turning to the drawings, FIGS. 1 and 2, there is illustrated a preferred oxidation system having generally a mixing zone (2) and an oxidizing zone (3). The preferred oxidation system may also be equipped with a cooling zone (4), an optional condenser (5), and an optional absorption column (6). However, as can be readily appreciated, this illustration or description of the preferred embodiments does not preclude numerous variations thereof, which will become readily apparent to or obvious to those skilled in the art.

In FIGS. 1 and 2, oxidizable reactant and oxidant are introduced into at least one packed bed (7) containing inert packing materials located in a mixing zone (2) at a particular superficial velocity (about 3 ft/s to 20 ft/s when ammonia is introduced to form nitric acid) to form a mixture containing oxidant and oxidizable reactant at a temperature below the auto-ignition temperature of the mixture. The type of oxidizable reactants introduced in at least one packed bed (7) may vary depending on the desired product. For instance, the use of benzene as a reactant may be appropriate if the desired product is maleic hydride. On the other hand, ammonia or a mixture of ammonia and methane is an appropriate reactant if the desired product is nitric acid or hydrogen cyanide. Of course, it is well known what oxidizable reactants can be used in a given vapor phase reaction to produce the desired product. The preferred oxidizable reactant is selected from at least one of methanol, benzene, naphthalene, ortho-xylene, cumene, methane, propylene, acrolein and ammonia.

A cooling medium, such as water, and other inert fluids may also be introduced into at least one packed bed (7) in the atomized form and/or into annulus region (8) of the mixing zone (2). It is, however, preferred that water be dispersed into at least one packed bed (7) in an atomized form to moderate the temperatures of the packed bed and an adjoining reactor in the oxidizing zone (3). The atomization is accomplished by injecting it into a small orifice under pressure. The injection rate of water is sufficient to maintain the temperature of the mixing zone (2) below the auto-ignition temperature of the desired reactant-oxidant mixture, usually less than 600° C. with the upper limit being based on the types of reactants involved. When, for example, ammonia is used as a reactant, this injection rate may be translated into an amount which is in the range of about 0.5 to about 0.9 tons of water per ton of ammonia used. The amount of water added may be equivalent to the amount of water typically used in the absorption column (6) for converting oxidized ammonia into nitric acid. By using this amount of water, the need for additional process water in the absorption column (6) will be eliminated since the entire process would be "water balanced". It is understood that other temperature moderating fluids, such as NO, $NO_2$, or $CO_2$, may be used in a similar manner as water to moderate the temperature.

The mixing zone (2) can be constructed using a conventional shell and tube heat exchanger system design. This design comprises one or more tubes with inert packing materials inside and cooling medium on shell side thereof. The tube having inert packing materials (the packed bed) is usually sufficiently lengthened to provide a thoroughly mixed oxidizable reactant-oxidant mixture. Such a length is generally dependent on the volume of oxidant and oxidizable reactant fed to the packed bed (7). When, for instance, ammonia is used as a reactant in conventional nitric acid production systems, the packed bed having a length of about 2 to about 40 ft., preferably about 10 to about 30 ft., is usually used.

Basically, the packed bed (7) is designed to prevent the propagation of flammable and/or explosive reactions which are associated with high oxidizable reactant concentrations in oxidizable reactant-oxidant mixtures, more particularly with high ammonia concentrations in ammonia-oxidant mixtures. Such a design is accomplished by using particular inert packing materials having particular particle sizes. The particular inert packing materials utilized, for example, are selected from at least one of ceramics, gravel, sand, glass beads, limestone and other materials which tend to be non-combustible in the mixing zone. Endothermic types of the inert packing materials (those react in a given environment to consume heat) are also found to be useful. Some of these endothermic materials include limestone (which not only uses heat to liberate carbon dioxide but the carbon dioxide acts to quench combustion) and perlite (which can comprise water that can be liberated and vaporized during the mixing). The endothermic materials provide an increased heat sink over that provided by other inert materials which simply consume heat in the form of an increase in mass temperature.

These particular inert packing materials are also sized to provide a good heat sink, limited free gas space and a low pressure drop along the length of the packed bed. The size of the inert packing materials is sufficiently large so that the packing has a reasonably small impact on the pressure required for injecting oxidant and oxidizable reactant. At the same time, the size of the inert packing materials is sufficiently small so that it provides adequate heat transfer surface and a good heat sink per volume of packing and limits free gas space in the packed bed. The good inert sink with limited free gas space inhibit or minimize flammable and/or explosive reactions while the low pressure drop along the length of the bed allows oxidizable reactants and oxidant to flow and mix efficiently in the mixing zone.

Accordingly, the maximum particle diameter of the inert packing materials is determined by the following particle size diameter equation:

$$DP \leq 0.61\, Dt\, \frac{VSD}{VLB} - .727\, Dt$$

DP = diameter of inert spherical packing material (in.).
VSD = superficial velocity at design inlet conditions (ft/sec)
VLB = laminar burning velocity of mixture (ft/sec)
Dt = diameter of packed tube (in.)

The maximum particle diameter is a calculated based data available for laminar burning velocities of an oxidizable reactant, such as ammonia, in oxygen. The laminar burning velocity is defined as the velocity of the unburned gases normal to the combustion wave surface as these gases move into the combustion front. Verification of the calculated value is required prior to commercial implementation.

On the other hand, the preferred minimum particle diameter of the sphere shaped inert packing materials is determined to be about 0.08 inches. This minimum size avoids packing that result in unacceptable pressure gradients for normal tube diameter (1 inch).

To use non-spherical packing materials which are equivalent to the spherical inert packing materials above, the minimum and maximum particle sizes should be determined through using the following equation:

$$Dp = 6\frac{Vp}{Sp}$$

Dp = diameter of spherical inert packing material
Vp = volume of non-spherical inert packing materials (in$^3$)
Sp = surface area of non-spherical inert packing materials (in$^2$).

The proper distribution of inert packing materials based on their sizes may also inhibit combustion reactions from propagating at an uncontrolled rate while improving the flow and mixing of oxidant and oxidizable reactants. Usually, the acceptable particle size distribution consists essentially of particles having a largest particle volume which is less than about 6 times the volume of the smallest particle. The preferred particle size distribution consists essentially of particles having a largest particle volume which is less than about 1.5 times the volume of the smallest particle.

Once a mixture containing oxidant and oxidizable reactant is formed in a packed bed containing the above inert packing materials, it is directly fed into an adjoining reaction zone having at least one reactor which may be surrounded by an external cooling jacket. At least one reactor comprises a packed bed of oxidation catalysts which are capable of selectively promoting the oxidation of particular oxidizable reactants. It is understood that various oxidation catalysts can be employed as long as they are useful for promoting the oxidation of oxidizable reactants, without inducing the formation of undesirable products. The type of oxidation catalysts used may vary depending on their effectiveness in a given oxidation reaction. The preferred oxidation catalysts, for example, may contain a 90% platinum plus 10% rhodium material (based on weight) when used in the oxidation of ammonia (to form nitric acid).

During the oxidation of oxidizable reactants, especially ammonia, there is a danger that the use of an oxidizable reactant-oxidant mixture having a particular volume of the reactant, at least about 13% by volume ammonia in an ammonia-oxidant mixture, may cause flammable and/or explosive reactions which are uncontrollable. Cooling the reactor via an external cooling jacket or other indirect heat exchange means is usually insufficient to prevent such reactions. By using oxidation catalysts in the form of a packed bed in a reactor with a finely mixed oxidizable reactant oxidant feed mixture, however, such reactions are minimized. Even though the oxidizable reactant-oxidant mixture, particularly the ammonia-oxidant mixture, is flammable, it would be unable to propagate at an uncontrolled rate due to the limited gas space available in the reactor and due to the well mixed reactant and oxidant. Rather, a series of controlled small and localized low energy release reactions would occur in the catalyst reactor bed.

The packed bed of oxidation catalysts is formed through utilizing particularly size catalyst particles. The size of the catalyst particles affects the availability of free gas space within the catalyst reactor bed and the pressure drop necessary to maintain the flow of a mixture containing an oxidizable reactant and oxidant therein. The preferred catalyst particle sizes are determined through the above equation and limitations, which are used to determine the size of the inert packing materials. Indeed, the catalyst particle sizes may be identical or substantially identical to the sizes of the inert packing materials. This catalyst packed bed may have a length of about 2 ft to about 40 ft., particularly when ammonia is conventionally oxidized.

In the catalysts reactor bed, there may be means for dispersing or introducing water to further inhibit the propagation of uncontrolled reactions. Water, for example, may be dispersed into the catalyst reactor bed in an atomized form to moderate the temperature therein. The atomization of water is accomplished by injecting it into a small orifice under pressure. The injection rate of water is sufficient to maintain the temperature of the reactor to about 700° to 1000° C. It is understood, however, that other temperature moderating fluids, such as NO, $NO_2$, $CO_2$, or other inert fluid, may be used in a similar manner as water to moderate the temperature of a reactor.

In normal operation the dispersion or introduction of the temperature moderating fluids in the reactor may not be necessary. The heat sink of the packing (catalyst bed) and the regulation of the space velocity of a thoroughly mixed mixture containing the reactant and oxidant may be sufficient to prevent any flammable or explosive reactions from propagating. The desired space velocity reduces the amount of heat produced during the oxidation, whereas the packing consumes the produced heat in the form of an increase in mass temperature.

Adjacent to the reactor, there is provided an optional cooling zone (4) comprising a downstream waste heat boiler system. The waste heat boiler system, which is in communication with the reactor, is particularly useful in removing at least a portion of heat in a gas containing oxidized reactant, particularly a gas containing nitrogen oxide which is formed by oxidizing ammonia. As used herein "nitrogen oxide" means any nitrogen oxide including $NO_2$, $N_2O$, NO and $N_2O_4$. In removing heat from these gases from the oxidation reactor, the boiler system uses indirect and/or direct cooling means. The indirect cooling usually involves utilization of a cooling medium in an external cooling jacket and/or internally placed heat recovery units, such as pipes, while the direct cooling involves dispersing temperature moderating means, such as water, $NO_2$ or other inert fluid directly into the gas stream derived from the oxidation reactor. Although any combination of the cooling means can be used, the use of water in the form of an indirect cooling means is generally preferred. Such an indirect cooling means is not only useful for cooling the gas but also is useful for generating steam which can be used to operate various mechanical devices.

The gas stream, after being cooled in the boiler system, may be sent to an optional condenser (5). In the optional condenser (5), the gas stream can be further cooled. If the gas stream contains nitrogen oxide, weak nitric acid can be produced. Depending on the amount of water moisture present in the gas stream (due to using water as a temperature moderating means in either the packed bed of inert packing materials, the packed bed of oxidation catalysts and/or waste heat boiler system), a substantial or insignificant amount of nitric acid can be obtained via the condenser (5). The amount of nitric acid usually corresponds to the amount of water present. The gas stream containing any unreacted nitrogen oxides, of course, can be delivered to the absorption column (6). In the absorption column (6), the nitrogen oxides in the gas stream are absorbed in water. The adsorption tower would be designed according to standard practice to maximize the nitric acid production. No absorption column (6), however, may be necessary if a sufficient amount of nitric acid is already recovered from the condenser (5) as a result of adding a sufficient amount of water in either the packed bed of inert packing materials, reactor and/or waste heat boiler system.

Any unreacted gases from the absorption column (6) or condenser (5) may be recycled back to the mixing zone (2) and/or to the oxidizing zone (3) via a line (9) and/or (10). The unreacted gases can be employed as a temperature moderating means and/or can be oxidized further to form additional nitric acid.

The following example serves to further illustrate the invention. It is presented for illustrative purposes and is not intended to be limiting.

EXAMPLE 1

In accordance with one embodiment of the present invention, nitric acid can be produced using an apparatus comprising a packed bed of inert packing materials, a reactor having a packed bed of oxidation catalysts and a waste heat boiler system as shown in FIG. 1. The inert packing materials could be ceramic aluminum oxide balls having a mean diameter falling within the range defined by the maximum packing particle diameter equation where, "Dt" was equal to about 3, "VSD" was equal to about 8 ft/sec and "VLB" was equal to about 5.6 ft/sec. The packed bed formed had a length of about 7.0 ft with particle distribution which was defined by the volume of the largest size ceramic balls being less than about 1.5 times the volume of the smallest ceramic balls. The reactor would be filled with spherically shaped Platinum-Rhodium catalysts in the form of a packed bed having a length of about 15 ft. The particle sizes and distribution of the catalysts would be substantially the same as those employed in the packed bed of inert packing materials.

Initially, ammonia would be fed into the above aluminum oxide packed bed integrated into a shell and tube heat exchanger to provide indirect cooling means at a rate of about 100 tons per day. To the same packed bed, technically pure oxygen would also be fed to form a mixture containing ammonia and oxygen. The mixture would be formed at a temperature below the auto-ignition temperature of the mixture. The concentration of ammonia in the mixture would be about 33% by volume. This mixture from the packed bed containing the ceramic aluminum balls would be subsequently introduced to the above reactor after being cooled by indirect heat exchange means. In the reactor, the ammonia in the mixture would be oxidized in the presence of platinum-rhodium catalysts to form a gas stream containing nitrogen oxides. The gas stream would then be cooled in the adjoining downstream waste heat boiler system which would use a conventional convective heat exchange unit. Through utilizing the packed beds of ceramic balls and oxidation catalysts with the indirect heat exchange means, the temperatures of the reactor and boiler system would be maintained at about 1000° C. and about 400° C., respectively, in spite of the mixture engendering an adiabatic flame temperature of about 1890° C. during the oxidation as shown by Table I below:

TABLE I

| Stream # | 1 | 2 | 3 |
|---|---|---|---|
| Description | Mixed | Reactor | Boiler |
| P (Bar) | 2 | <2 | <2 |
| T (°C.) | 50 | 1000 | 400 |
| H (MJ) | −1437 | −5531 | −7927 |
| Mole Flow (k moles) | | | |
| $H_2O$ | — | 49.9 | 49.9 |
| NO | — | 29.5 | 29.5 |
| $O_2$ | 67.0 | 25.6 | 25.6 |
| $N_2O$ | — | 1.7 | 1.7 |
| $NO_2$ | — | 0.5 | 0.5 |
| $N_2O_4$ | — | — | — |
| $NH_3$ | 33.0 | — | — |
| Total Flow (k mol) | 100.0 | 107.2 | 107.2 |
| Heat Released (Duty) (MJ) | — | −4094 | −2396 |

Adiabatic Flame Temperature = 1898° C.
Heat Duty per 100 T/D $NH_3$ Processed
 = 28.8 MMBtu/hr (Reactor)
 = 16.8 MMBtu/hr (Boiler)
 = 45.6 MMBtu/hr (Total)

The results tabulated in Table I indicate that the concentration of ammonia in the ammonia-oxygen mixture can be increased to about 33% by volume without damaging the reactor. This higher ammonia concentration would enable the capacity of an existing nitric acid plant to be expanded by at least about 350%. Conversely, a new grassroots nitric acid plant can be reduced in size by at least about 70% over that required with use of conventional methods and still can produce the same amount of nitric acid.

Although the process of this invention has been described in detail with reference to certain embodiments, those skilled in the art will recognize that there are other embodiments of the invention within the spirit and scope of the claims.

What is claimed is:

1. A process for oxidizing at least one oxidizable reactant selected from the group consisting of methanol, benzene, naphthalene, orthoxylene, cumene, methane, propylene, acrolein and ammonia with oxidant, said process comprising: introducing said reactant and oxidant into a packed bed containing inert packing materials to form a mixture at a temperature below the auto-ignition temperature of the resulting mixture and then subjecting said resulting mixture to an oxidation reaction condition to oxidize said reactant and wherein said inert packing materials are spherically shaped particles whose maximum diameter sizes are defined by the equation:

$$DP \leq 0.61 \, Dt \frac{VSD}{VLB} - .727 \, Dt$$

DP = diameter of inert spherical packing material (in.)
VSD = superficial velocity at design inlet conditions (ft/sec)
VLB = laminar burning velocity of mixture (ft/sec)
Dt = diameter of packed tube (in.).

2. A process according to claim 1, wherein said inert packing materials are non-combustible materials selected from the group consisting of ceramics, gravel, sand, glass beads, limestone and combinations thereof.

3. A process according to claim 1, wherein said inert packing materials are non-combustible materials which are endothermic.

4. A process according to claim 1, further comprising introducing a temperature moderating means comprising water into said packed bed during the introduction of said reactant and oxidant to maintain the temperature below the autoignition temperature of the mixture.

5. A process according to claim 4, wherein said reactant is ammonia and wherein the amount of said ammonia and oxidant introduced is such that the concentration of ammonia in said mixture is at least about 15% by volume.

6. A process according to claim 5 wherein the amount of water introduced into said packed bed is within the range of about 0.5 tons to 0.9 tons of water per ton of said ammonia.

7. A process according to claim 4, further comprising introducing said resulting mixture into a reactor containing oxidation catalysts in the form of a packed bed to oxidize the reactant therein.

8. A process according to claim 7 further comprising removing or recovering at least a portion of said heat from the oxidized reactant via a downstream waste heat boiler system.

9. A process according to claim 8, wherein said oxidized reactant comprises nitrogen oxides.

10. A process according to claim 9, further comprising condensing at least a portion of the nitrogen oxides thereof further in the presence of water to remove at least a portion of the nitrogen oxide in the form of nitric acid.

11. A process according to claim 1, wherein said oxidant has an oxygen concentration of at least about 30 percent.

12. A process according to claim 1, further comprising indirectly cooling said packed bed containing inert packing materials.

13. A process for oxidizing at least one oxidizable reactant selected from the group consisting of methanol, benzene, naphthalene, orthoxylene, cumene, methane, propylene, acrolein and ammonia with oxidant, said process comprising: introducing a mixture containing said at least one oxidizable reactant and oxidant into at least one reactor containing oxidation catalysts in the form of a packed bed, wherein the maximum particle diameter of said oxidation catalysts is defined by the equation:

$$DP < 0.61 \, Dt \frac{VSD}{VLB} - .727 \, Dt$$

DP = diameter of spherical packing catalytic material (in.)
VSD = superficial velocity at design inlet conditions (ft/sec)
VLB = laminar burning velocity of said mixture (ft/sec)
Dt = diameter of packed tube (in.)
and oxidizing said reactant in the presence of said oxidant in said reactor containing said oxidation catalysts.

14. A process according to claim 13, wherein said at least one oxidizable reactant is ammonia and wherein the concentration of ammonia in said mixture is at least 13% to about 33% by volume.

15. A process according to claim 14, wherein said oxidizing is carried out in the presence of water.

16. A process for oxidizing at least one oxidizable reactant which is susceptible to flammable or explosive reactions during oxidation, said process comprising: introducing said at least one oxidizable reactant and oxidant into a packed bed containing inert packing materials at a temperature below the auto-ignition temperature of the resulting mixture, wherein the maximum particle diameter of said inert packing materials are defined by the equation:

$$DP < 0.61 \, Dt \frac{VSD}{VLB} - .727 \, Dt$$

DP = diameter of inert spherical packing material (in.)
VSD = superficial velocity at design inlet conditions (ft/sec)
VLB = laminar burning velocity of said mixture (ft/sec)
Dt = diameter of packed tube (in.)
and then subjecting said resulting mixture to an oxidation reaction condition in the presence of oxidation catalyst particles to oxidize said at least one oxidizable reactant.

* * * * *